(12) United States Patent
Moriwaki et al.

(10) Patent No.: US 6,635,382 B2
(45) Date of Patent: Oct. 21, 2003

(54) LITHIUM SECONDARY BATTERY AND METHOD OF MANUFACTURING THE SAME

(75) Inventors: Yoshio Moriwaki, Hirakata (JP); Masakage Komori, Utsunomiya (JP); Shingo Tsuda, Fujisawa (JP); Hidekazu Eguchi, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 113 days.

(21) Appl. No.: 09/890,870

(22) PCT Filed: Dec. 1, 2000

(86) PCT No.: PCT/JP00/08557
§ 371 (c)(1),
(2), (4) Date: Aug. 7, 2001

(87) PCT Pub. No.: WO01/75990
PCT Pub. Date: Oct. 11, 2001

(65) Prior Publication Data
US 2002/0197529 A1 Dec. 26, 2002

(30) Foreign Application Priority Data
Apr. 4, 2000 (JP) .................................. 2000-101941

(51) Int. Cl.[7] .............................................. H01M 2/02
(52) U.S. Cl. .................. 429/176; 429/231.95; 429/163; 429/164; 429/166; 429/167; 429/168; 429/177; 29/623.1; 29/623.3
(58) Field of Search ................ 429/231.95, 163, 429/164, 166, 167, 168, 176, 177; 29/623.1, 623.3

(56) References Cited

U.S. PATENT DOCUMENTS 3,966,490 A  6/1976  Auborn

FOREIGN PATENT DOCUMENTS

| EP | 09316580 | * 12/1997 | ........... C22C/21/00 |
| EP | 0835908 A1 | 4/1998 | |
| EP | 0944119 A1 | 9/1999 | |
| JP | 6-65668 | 3/1994 | |
| JP | 8-329908 | 12/1996 | |
| JP | 9-316580 | 12/1997 | |
| JP | 11-25933 | 1/1999 | |
| JP | 11-86805 | 3/1999 | |

* cited by examiner

*Primary Examiner*—Patrick Ryan
*Assistant Examiner*—Angel J Martin
(74) *Attorney, Agent, or Firm*—McDermott, Will & Emery

(57) ABSTRACT

The present invention uses a magnesium-based alloy which is excellent in mechanical workability to be formed thinner than conventional alloys. The present invention provides a lithium secondary battery comprising an electrode assembly and a non-aqueous electrolyte, both accommodated in a metal jacket, wherein the metal jacket is made of a magnesium-based alloy containing lithium in an amount of 7 to 20% by weight; and a metal layer or an insulating layer for preventing corrosion of the metal jacket is formed integrally with the metal jacket on the inner wall thereof.

18 Claims, 4 Drawing Sheets

LITHIUM SECONDARY BATTERY AND METHOD OF MANUFACTURING THE SAME

TECHNICAL FIELD

The present invention relates to a lithium secondary battery and a method of manufacturing the same. More specifically, the invention relates to a metal jacket of a lithium secondary battery made of a magnesium-based alloy containing lithium (Mg—Li alloy).

BACKGROUND ART

With the recent prevalence of portable apparatuses, demands for secondary batteries have been increased. In particular, a lithium secondary battery containing an organic electrolyte, which enables a reduction in the size and weight of such a portable apparatus, has obtained a rapidly increasing share in the market. Though the majority of conventional lithium secondary batteries have cylindrical or coin-like shapes, the number of secondary batteries having rectangular shapes have begun increasing recently. In addition, sheet-like thin batteries have made their debut.

It is very important to increase the energy density of a battery. The energy density of a battery can be expressed by volume energy density (Wh/liter), which indicates the size of a battery, and weight energy density (Wh/kg), which indicates the weight of a battery. From the viewpoint of a reduction in size and weight, a battery is required to have a higher volume energy density and weight energy density, because a keen competition exists in the market of such batteries.

The energy density of a battery is determined mainly by active materials of the positive and negative electrodes as the power generating elements. Other important determinants include the electrolyte and the separator. Improvements in these determinants are being intensively made in pursuit of a battery having a higher energy density.

A metal jacket for accommodating such power generating elements is also reviewed as an important factor of a reduction in size and weight of a battery and is being improved actively. If the metal jacket has a thinner wall, larger quantities of the active materials can be accommodated within the metal jacket in a conventional shape. This leads to an improvement in the volume energy density of the battery. Alternatively, if the weight of the metal jacket can be reduced, the weight of the battery in a conventional shape can be reduced. This leads to an improvement in the weight energy density of the battery.

One known example of a battery with a light metal jacket is a lithium ion battery in a rectangular shape that employs a metal jacket made of a light aluminum-based alloy sheet (specific gravity: about 2.8 g/cc) instead of a conventional steel sheet (specific gravity: about 7.9 g/cc). In the technical field of batteries for use in cellular phones, there is known a case where the weight energy density of a battery has been increased by about 10% by employing the metal jacket made of an aluminum-based alloy (refer to JAPANESE PATENT LAID-OPEN GAZETTE No. HEI 8-329908).

Many methods of manufacturing such metal jackets made of aluminum or aluminum-based alloy have an impact process or a drawing process.

Attention has recently been focused on magnesium-based alloys, which are lighter than aluminum or aluminum-based alloys. The specific gravity of magnesium is 1.74 g/cc, whereas that of aluminum is 2.7 g/cc. Examples of well-known magnesium-based alloys include alloys comprising magnesium admixed with Al, Zn or the like. Some cases are known where a magnesium-based alloy is used for the metal jacket of a battery (refer to JAPANESE PATENT LAID-OPEN GAZETTE Nos. HEI 11-25933 and HEI 11-86805).

Further, attention has recently been paid to magnesium-based alloys containing lithium which have superplasticity (refer to JAPANESE PATENT LAID-OPEN GAZETTE No. HEI 6-65668). Magnesium-based alloys containing lithium are characterized in that they have smaller specific gravity (about 1.3 to 1.4 g/cc) than pure Mg and are superior in mechanical workability to conventional magnesium-based alloys containing Al.

There is, however, not known any case where a magnesium-based alloy containing lithium is applied to a metal jacket for a battery.

Meanwhile, thixomolding process is receiving attention as a novel technique for processing magnesium-based alloys in the art of structural material for use in various electric appliances. Thixomolding process is a modification of the diecasting process, which has been the mainstream of the conventional technology, and is similar to the injection molding process for plastics. Specifically, this process injects a raw material alloy in a semi-molten state into a mold, solidifies the raw material alloy, and then removes the molded product from the mold. The resultant crystal of the molded product is not of a dendritic structure, which results from the diecasting process, but of a granular structure, which results from the solidification process under stress. The alloy having a granular structure exhibits such features as improved mechanical properties and stabilized quality even when made thin.

There is, however, not known any case where a magnesium-based alloy containing lithium obtained by thixomolding process is applied to a metal jacket for a battery.

Though there are some cases where magnesium-based alloys are used for metal jackets (JAPANESE PATENT LAID-OPEN GAZETTE Nos. HEI 11-25933 and HEI 11-86805) as described above, the conventional magnesium-based alloys have poor workability and hence have been difficult to be applied to metal jackets for batteries practically. Further, since magnesium-based alloys are corroded when brought into contact with a power generating element such as an electrolyte, the use of a magnesium-based alloy has not been practical in view of realizing a satisfactory charge/discharge cycle.

DISCLOSURE OF INVENTION

The present invention has been made to provide a lithium secondary battery having a higher capacity and a lighter weight than the prior art battery. To this end, the present invention uses, as the raw material of a metal jacket, a specified magnesium-based alloy containing lithium (Mg—Li alloy) that can be subjected to a processing of bending, deep drawing or the like in the cold work, the process having been considered difficult for conventional magnesium-based alloys. In one embodiment of the present invention, a light and high-strength lithium secondary battery of high quality is manufactured by the use of a sheet of a magnesium-based alloy containing lithium obtained by the thixomolding process.

In the present invention, the metal jacket is prevented from corrosion due to contact with the electrolyte or the like by forming a metal layer or an insulating layer integrally with the metal jacket on the inner wall thereof. As a result, it becomes possible to realize a stabilized charge/discharge cycle, which has been considered impossible to realize for a battery having a metal jacket made of a magnesium-based alloy.

Among light batteries, in the case of a battery using a metal jacket made of an aluminum or aluminum-based alloy, the negative electrode of the battery cannot be connected to the metal jacket. This is because the connection between the metal jacket and the negative electrode would facilitate the production of an intermetallic compound such as AlLi that makes the metal jacket brittle. The majority of conventional batteries, however, have a structure in which the metal jacket is connected to the negative electrode. From the viewpoint of obtaining a general-purpose battery, it is desired that the metal jacket should be electrically connected to the negative electrode.

The metal jacket of the battery in accordance with the present invention, in contrast, is free from an inconvenience such as embrittlement even when electrically connected to the negative electrode by virtue of the metal layer or the insulting layer formed integrally with the metal jacket. Thus, the battery of the present invention is superior in terms of versatility also.

The present invention is directed to a lithium secondary battery comprising an electrode assembly and a non-aqueous electrolyte, both accommodated in a metal jacket, wherein the metal jacket is made of a magnesium-based alloy containing lithium in an amount of 7 to 20% by weight; and a metal layer is formed integrally with the metal jacket on the inner wall thereof for preventing corrosion of the metal jacket. The electrode assembly comprises a positive electrode, a negative electrode and a separator in general.

In this battery, the magnesium-based alloy containing lithium preferably contains lithium in an amount of 7 to 15% by weight, and at least one element selected from the group consisting of Al, Zn, Mn, Zr, Ca, Si, and rare earth elements in a total amount of 0.3 to 5% by weight.

Alternatively, the magnesium-based alloy containing lithium may be a binary alloy containing lithium in an amount of 12 to 16% by weight.

The metal layer for preventing corrosion of the metal jacket preferably comprises Ni or Cu.

Further, the metal layer is preferably formed by cladding, plating or vapor-deposition.

The present invention is also directed to a lithium secondary battery comprising an electrode assembly and a non-aqueous electrolyte, both accommodated in a metal jacket, wherein the metal jacket is made of a magnesium-based alloy containing lithium in an amount of 7 to 15% by weight, and at least one element selected from the group consisting of Al, Zn, and Mn in a total amount of 0.3 to 5% by weight; an Ni layer having a thickness of 2 to 20 $\mu$m is formed integrally with the metal jacket on the inner wall thereof by cladding; and the metal jacket is electrically connected to a negative electrode in the electrode assembly.

In this construction, the magnesium-based alloy containing lithium is preferably produced by thixomolding.

Preferably, the metal jacket is in a shape of a bottomed can with an open top, having a bottom/side wall thickness ratio (bottom wall thickness/side wall thickness) of 1.1 to 2.0, and the magnesium-based alloy containing lithium is produced by thixomolding.

The present invention is also directed to a method of manufacturing a lithium secondary battery, comprising the steps of: (1) preparing a sheet of a magnesium-based alloy containing lithium in an amount of 7 to 15% by weight, and at least one element selected from the group consisting of Al, Zn, and Mn in a total amount of 0.3 to 5% by weight by thixomolding; (2) forming a Ni layer integrally with the sheet on at least one face thereof by cladding; (3) forming a metal jacket in a shape of a bottomed can with an open top with the Ni layer formed on the inner wall thereof from the sheet by a mechanical processing selected from drawing, combined drawing and ironing, and impact; and (4) placing an electrode assembly and a non-aqueous electrolyte into the metal jacket.

The present invention is yet also directed to a lithium secondary battery comprising an electrode assembly and a non-aqueous electrolyte, both accommodated in a metal jacket, wherein the metal jacket is made of a magnesium-based alloy containing lithium in an amount of 7 to 20% by weight; and an insulating layer is formed integrally with the metal jacket on the inner wall thereof.

In this construction, the magnesium-based alloy containing lithium preferably contains lithium in an amount of 7 to 15% by weight, and at least one element selected from the group consisting of Al, Zn, Mn, Zr, Ca, Si, and rare earth elements in a total amount of 0.3 to 5% by weight.

Alternatively, the magnesium-based alloy containing lithium may be a binary alloy containing lithium in an amount of 12 to 16% by weight.

The insulating layer preferably comprises a metal oxide or a resin.

The present invention is still also directed to a lithium secondary battery comprising an electrode assembly and a non-aqueous electrolyte, both accommodated in a metal jacket, wherein the metal jacket is made of a magnesium-based alloy containing lithium in an amount of 7 to 15% by weight, and at least one element selected from the group consisting of Al, Zn, and Mn in a total amount of 0.3 to 5% by weight; and a resin layer having a thickness of 5 $\mu$m or more is formed integrally with the metal jacket on the inner wall thereof.

In this construction, the magnesium-based alloy containing lithium is preferably produced by thixomolding.

Preferably, the metal jacket is in a shape of a bottomed can with an open top, having a bottom/side wall thickness ratio (bottom wall thickness/side wall thickness) of 1.1 to 2.0, and the magnesium-based alloy is produced by thixomolding.

The present invention is still yet directed to a method of manufacturing a lithium secondary battery, comprising the steps of: (1) preparing a sheet of a magnesium-based alloy containing lithium in an amount of 7 to 15% by weight, and at least one element selected from the group consisting of Al, Zn, and Mn in a total amount of 0.3 to 5% by weight by thixomolding; (2) forming a resin layer integrally with the sheet on at least one face thereof; (3) forming a metal jacket in a shape of a bottomed can with an open top with the resin layer formed on the inner wall thereof from the sheet by a mechanical processing selected from drawing, combined drawing and ironing, and impact; and (4) placing an electrode assembly and a non-aqueous electrolyte into the metal jacket.

The present invention is further directed to a method of manufacturing a lithium secondary battery, comprising the steps of: (1) preparing a sheet of a magnesium-based alloy containing lithium in an amount of 7 to 15% by weight, and at least one element selected from the group consisting of Al, Zn, and Mn in a total amount of 0.3 to 5% by weight by thixomolding; (2) forming a metal jacket in a shape of a bottomed can with an open top from the sheet by a mechanical processing selected from drawing, combined drawing and ironing, and impact; (3) forming a resin layer integrally with the metal jacket on the inner wall thereof; and (4) placing an electrode assembly and a non-aqueous electrolyte into the metal jacket.

While the novel feature of the invention are set forth particularly in the appended claims, the invention, both as to organization and content, will be better understood and appreciated, along with other objects and features thereof, from the following detailed description taken in conjunction with the drawings.

BEST MODE FOR CARRYING OUT THE INVENTION

Figure 1:
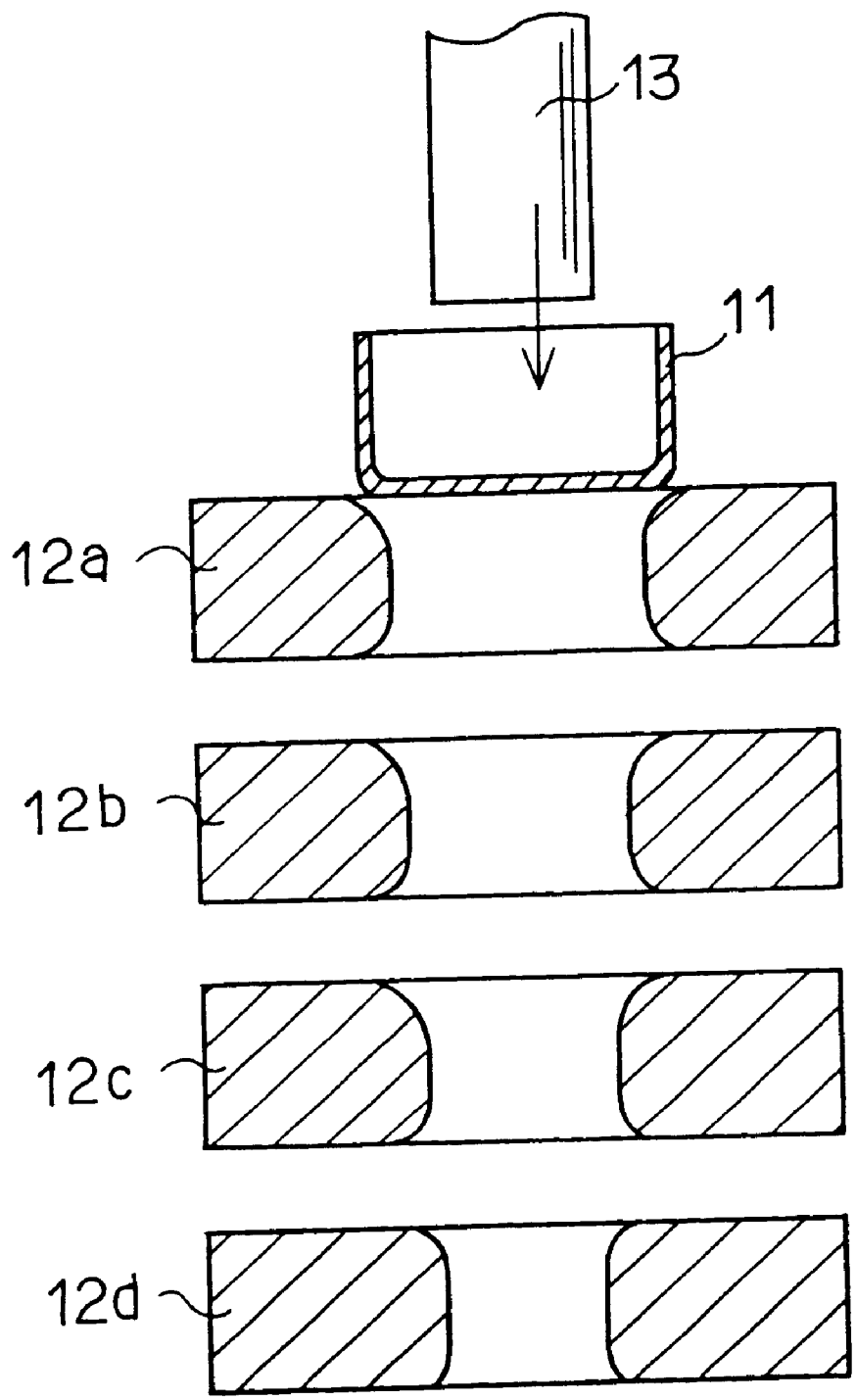
FIG. 1 is a view illustrating a cup made of an alloy before being introduced into an orifice formed by dies to conduct a combined drawing and ironing process for obtaining a metal jacket.

The metal jacket for use in the present invention is made of a magnesium-based alloy containing lithium in an amount of 7 to 20% by weight. The magnesium-based alloy has superplasticity. When the content of lithium in the alloy is less than 7% by weight, the mechanical workability of the alloy lowers. When the content of lithium in the alloy is more than 20% by weight, on the other hand, the corrosion resistance of the alloy becomes insufficient.

In the case that the magnesium-based alloy is a binary alloy substantially composed of only Mg and Li, the content of Li in the alloy is preferably 12 to 16% by weight. In the case that the magnesium-based alloy comprises three or more elements, on the other hand, the content of Li in the alloy is preferably 7 to 15% by weight. Such multi-element alloys comprising three or more elements preferably have a lower content of Li than the binary alloy.

Herein, any one of the alloys for use in the present invention may contain unavoidable impurities.

Preferably, the multi-element alloy contains element X, which is at least one element selected from the group consisting of Al, Zn, Mn, Zr, Ca, Si, and rare earth elements, in an amount of 0.3 to 5% by weight besides lithium in an amount of 7 to 15% by weight. The rare earth elements herein include lanthanoid elements ($^{57}$La to $^{71}$Lu), Sc, and Y.

By appropriately selecting one or more element from the aforementioned elements as the element X and the content thereof within the aforementioned range, it is possible to obtain an alloy having desired mechanical workability and corrosion resistance.

For the purpose of improving the strength of the alloy, use of Al as the element X, in particular, is preferable. For the purpose of improving the mechanical properties of the alloy, use of Zn as the element X is preferable. For the purpose of improving the corrosion resistance of the alloy, use of Mn as the element X is preferable.

When the content of the element X in the alloy is less than 0.3% by weight, the effect of the addition of the element X becomes insufficient. When the content of the element X in the alloy is more than 5% by weight, on the other hand, the resultant alloy tends to exhibit lowered mechanical workability.

Examples of specific alloys suitable for the metal jacket for use in the present invention include:

alloy (a): a binary alloy comprising 84 to 88% by weight of Mg, and 12 to 16% by weight of Li;

alloy (b): a ternary alloy comprising 80 to 92.7% by weight of Mg, 7 to 15% by weight of Li, and 0.3 to 5.0% by weight of Al;

alloy (c): a ternary alloy comprising 80 to 92.7% by weight of Mg, 7 to 15% by weight of Li, and 0.3 to 5.0% by weight of Zn;

alloy (d): a ternary alloy comprising 80 to 92.7% by weight of Mg, 7 to 15% by weight of Li, and 0.3 to 5.0% by weight of Mn;

alloy (e): a ternary alloy comprising 80 to 92.7% by weight of Mg, 7 to 15% by weight of Li, and 0.3 to 5.0% by weight of Zr;

alloy (f): a multi-element alloy comprising 80 to 92.7% by weight of Mg, 7 to 15% by weight of Li, and 0.3 to 5.0% by weight of misch metal (Mm: a mixture of rare earth elements);

alloy (g): a ternary alloy comprising 80 to 92.7% by weight of Mg, 7 to 15% by weight of Li, and 0.3 to 5.0% by weight of Y;

alloy (h): a quaternary alloy comprising 80 to 92.7% by weight of Mg, 7 to 15% by weight of Li, and a total amount of 0.3 to 5.0% by weight of Al and Zn;

alloy (i): a quaternary alloy comprising 80 to 92.7% by weight of Mg, 7 to 15% by weight of Li, and a total amount of 0.3 to 5.0% by weight of Al and Mn; and alloy (j): a multi-element alloy comprising 80 to 92.7% by weight of Mg, 7 to 15% by weight of Li, and a total amount of 0.3 to 5.0% by weight of Al and Mm.

Though the method for obtaining a metal jacket is not limited to any specified method, a method employing a mechanical processing of a sheet of the alloy into a shape of a bottomed can is generally conducted. Preferable mechanical processing include drawing, combined drawing and ironing, and impact.

Generally, the magnesium-based alloy containing lithium is formed into a metal jacket in a shape of a bottomed can with an open top, such as a cylindrical or rectangular shape, or analogous shape thereto with an open top.

Figure 2:
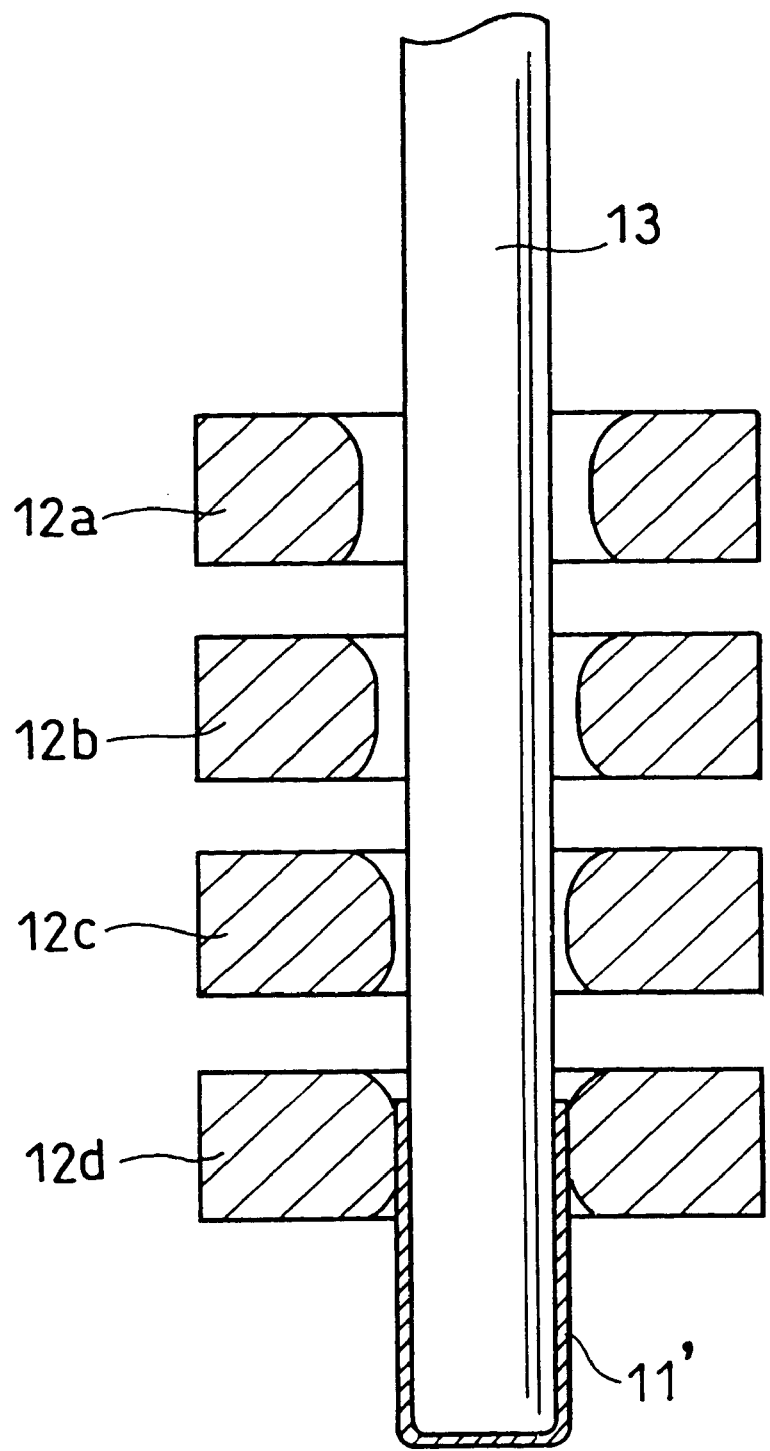
FIG. 2 is a view illustrating a cup made of an alloy passing through an orifice at the final die in a combined drawing and ironing process for obtaining a metal jacket.

With reference to FIGS. 1 and 2, an example of a combined drawing and ironing process is described. Here, the case where a bottomed cylindrical metal jacket with an open top is formed by this process is described.

First, a bottomed cylindrical cup 11 is formed from an alloy sheet. FIGS. 1 and 2 illustrate a process of forming the bottomed cylindrical cup 11 into a desired shape, with relevant portions in section.

In FIGS. 1 and 2, four ironing dies 12a to 12d are coaxially disposed in tiers. As shown in FIG. 1, the cup 11 is set on the upper portion of the ironing die 12a and then is forced into the central orifice formed by the dies by means of a punch 13. The diameter of the orifice is larger at a die through which the cup 11 passes earlier than at the succeeding die. The diameter of the punch 13 corresponds to the inner diameter of a desired metal jacket, while the diameter of the orifice at the last die 12d corresponds to the outer diameter of the desired metal jacket. Accordingly, the inner and outer diameters of the cup 11 become smaller consecutively as the cup 11 passes through the orifice, thereby obtained a desired metal jacket. FIG. 2 shows cup 11' passing through the orifice at the last die 12d, which has reduced inner and outer diameters and is elongated vertically. When the punch 13 is drawn out of the cup 11', a desired metal jacket is obtained. The side wall of the cup 11' is made thinner than that of the cup 11 by ironing. However, the thickness of the bottom wall does not vary significantly.

The side wall of a metal jacket obtained by the combined drawing and ironing or the like is thinner than the bottom wall. An alloy of higher workability tends to provide a higher bottom/side wall thickness ratio (bottom wall thickness/side wall thickness). A higher bottom/side wall thickness ratio is more effective in downsizing and weight-reduction of a battery. A preferable bottom/side wall thickness ratio ranges 1.1 to 2.0. When the bottom/side wall thickness ratio is less than 1.1, an unsatisfactory weight-reduction effect is likely. When the ratio is more than 2.0, the mechanical strength and the reliability of the battery are likely to lower.

In terms of further improvements in workability and mechanical strength, and more stabilized quality of the battery, the magnesium-based alloy containing lithium is preferably prepared by thixomolding. Specifically, the alloy is preferably obtained by injection-molding of a semi-molten alloy having a large thixotropy.

Two methods can be chiefly used for forming the metal jacket from an alloy prepared by thixomolding. One is to inject the semi-molten alloy directly into a mold having the inner shape corresponding to the shape of the metal jacket. The other is to prepare an alloy sheet by using injection-molding of the semi-molten alloy previously and then conduct a mechanical processing of the resultant alloy sheet for forming a metal jacket as described above. In terms of productivity, the latter method, i.e., a method employing a mechanical processing, is generally employed.

In using the magnesium-based alloy containing lithium for the metal jacket of a lithium secondary battery, it is necessary to take the corrosion resistance of the alloy and the structure of the battery into consideration. For this reason, the metal jacket used in the present invention is formed integrally with a metal layer for preventing corrosion of the metal jacket on the inner wall thereof. Alternatively, the metal jacket is formed integrally with an insulating layer on the inner wall thereof.

Figure 3:
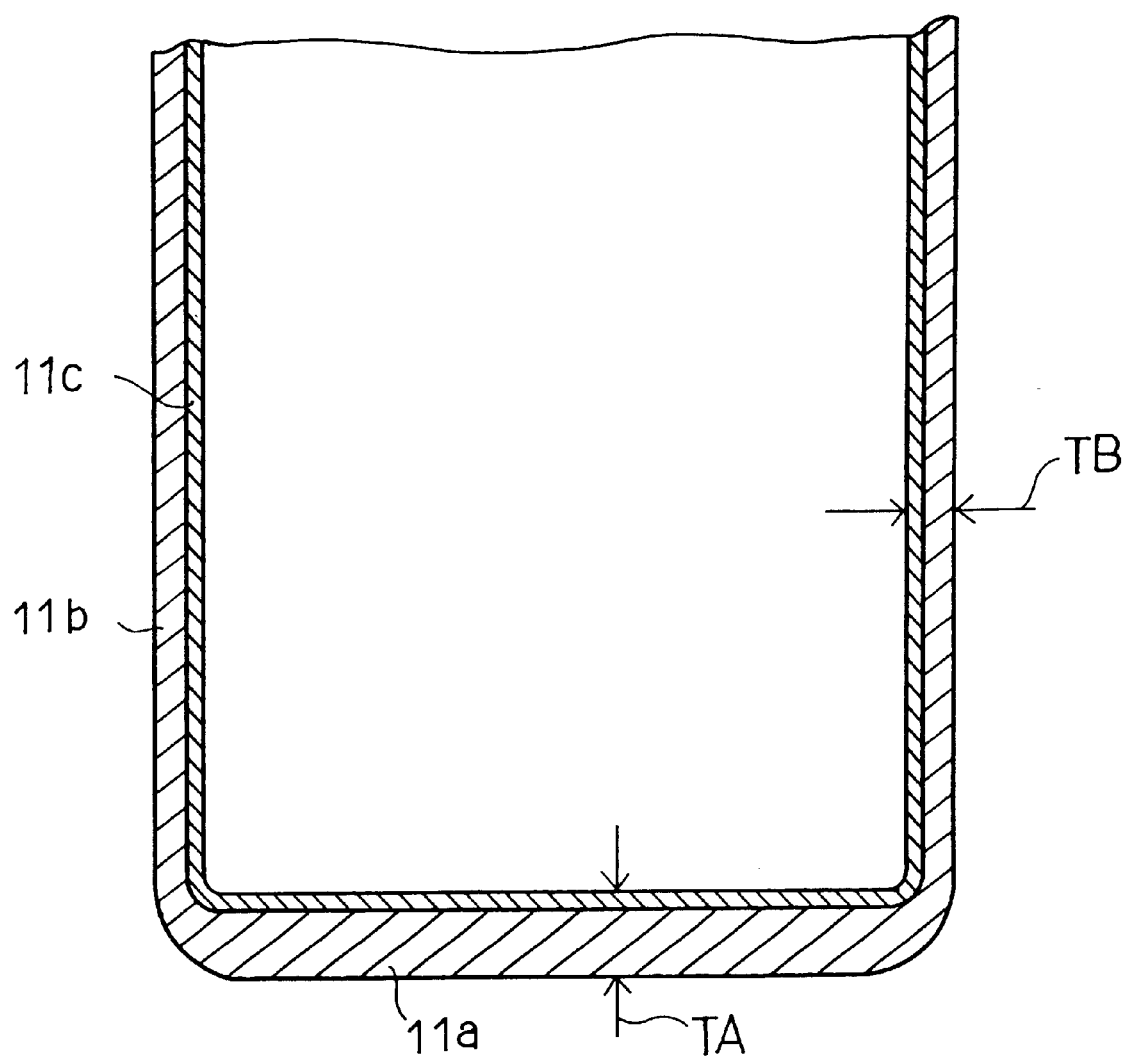
FIG. 3 is a vertical sectional view showing an examplary metal jacket of a lithium secondary battery in accordance with present invention.

An example of such a metal jacket having a metal layer 11c is shown in FIG. 3 schematically, wherein the thickness of the metal layer 11c is not accurately represented. Reference numerals 11a and 11b denote the bottom wall and the side wall, respectively, of the metal jacket. As described above, the side wall thickness (TB) is smaller than the bottom wall thickness (TA).

The metal jacket formed integrally with such a metal layer on the inner wall thereof is described first.

The magnesium-based alloy containing lithium is easy to corrode when brought into contact with an power generating element such as an electrolyte. Therefore, the metal layer formed on the inner wall of the metal jacket is required to comprise a metal that is stable against the power generating elements of the battery. In this respect, the metal layer is preferably a layer comprising Ni or Cu, for example. In obtaining the general-purpose battery, it is preferred that the metal jacket having a Ni layer on the inner wall thereof should be connected to the negative electrode.

Preferably, the metal layer is formed by a cladding process, wherein two or more thin metal sheets are piled and joined to each other integrally. Specifically, a metal sheet of Ni, Cu or the like is superposed on a sheet of the magnesium-based alloy to form a clad plate, which in turn is formed into the metal jacket having the metal layer on the inner wall thereof. Alternatively, such a metal layer may be formed on a sheet of the magnesium-based alloy by a chemical process such as plating or a physical process such as vapor-deposition. Instead, a metal paste may be applied to a sheet of the magnesium-based alloy. Alternatively, it is possible that the metal jacket is formed in the manner described above and then the metal layer is formed on the inner wall of the metal jacket by plating or vapor-deposition.

The thickness of the metal layer is preferably 2 to 20 $\mu$m. When the thickness of the metal layer is less than 2 $\mu$m, the effect preventing corrosion of the metal jacket is likely to become insufficient. On the other hand, when its thickness is more than 20 $\mu$m, the corrosion-preventive effect is saturated, whereas the effect reducing the weight of the battery is impaired. To ensure an adequate corrosion-preventive effect, the metal layer is preferably made to have a thickness of 5 to 20 $\mu$m.

In turn, the metal jacket formed integrally with the insulating layer on the inner wall thereof is described below.

The insulating layer is required to comprise a material that is stable against any power generating element of the battery. In this respect, the insulating layer is preferably a layer comprising a metal oxide or a resin, for example. From the viewpoint of easy handling, use of a resin layer is particularly preferable.

The formation of the metal oxide layer is conveniently achieved by, for example, a process of positively oxidizing the inner wall of the metal jacket. The formation of the resin layer is preferably achieved by a process including spraying a resin dispersion onto the inner wall of the metal jacket and heating the sprayed resin dispersion to a temperature equal to or higher than the melting point of the resin component of the dispersion after drying. With this process, the resin component is melted by heating and is turned into a film which is firmly integrated with the inner wall of the metal jacket.

Polyethylene, polypropylene or the like is suitable as the resin forming the resin layer in terms of their excellent corrosion resistance to the electrolyte.

Preferably, the thickness of the insulating layer is 5 $\mu$m or more. When its thickness is less than 5 $\mu$m, the corrosion-preventive effect is likely to become insufficient. When its thickness is more than 200 $\mu$m, for example, the battery is unlikely to have a higher energy density as desired.

Some examples of preferred methods of manufacturing the lithium secondary battery in accordance with the present invention are listed below.

Embodiment 1

First, a sheet of a magnesium-based alloy containing lithium in an amount of 7 to 15% by weight, and at least one element selected from the group consisting of Al, Zn, and Mn in a total amount of 0.3 to 5.0% by weight is prepared.

Next, the prepared sheet and a Ni sheet are piled and joined to each other to form a clad plate having a Ni layer on at least one face thereof.

Subsequently, the clad plate is subjected to a mechanical processing selected from drawing, combined drawing and ironing, and impact to form a metal jacket in a shape of a bottomed can having the Ni layer on the inner wall thereof.

Finally, an electrode assembly and a non-aqueous electrolyte are placed into the metal jacket.

Embodiment 2

First, a sheet of a magnesium-based alloy containing lithium in an amount of 7 to 15% by weight, and at least one element selected from the group consisting of Al, Zn, and Mn in a total amount of 0.3 to 5.0% by weight is prepared.

Next, the prepared sheet is subjected to a mechanical processing selected from drawing, combined drawing and ironing, and impact to form a metal jacket in a shape of bottomed can.

Subsequently, a resin dispersion containing a resin component such as polyethylene, polypropylene or the like is sprayed onto the inner wall of the metal jacket, followed by drying, and then the sprayed resin component is heated to a temperature equal to or higher than the melting point of the resin component.

Finally, an electrode assembly and a non-aqueous electrolyte are placed into the metal jacket.

Figure 4:
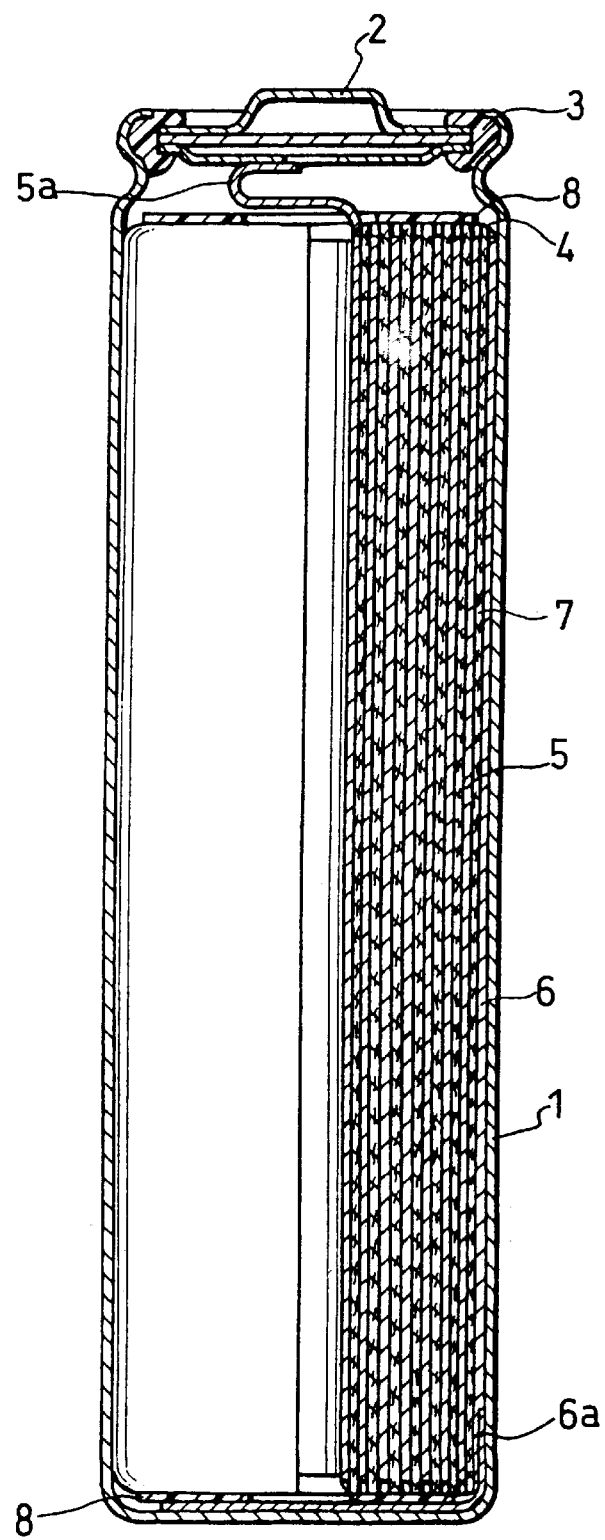
FIG. 4 is a vertical sectional view showing the structure of an exemplary lithium secondary battery in accordance with the present invention.

An example of the structure of a cylindrical lithium secondary battery is described below with reference to FIG. 4 showing the structure partly in section.

In FIG. 4, a battery case 1 is a metal jacket having a Ni layer on the inner wall thereof. Since the Ni layer is very thin relative to the thickness of the metal jacket, the depiction of the Ni layer is omitted from FIG. 4.

Within the battery case 1 are accommodated power generating elements including an electrode assembly 4 and a non-aqueous electrolyte, whereas the non-aqueous electrolyte is not depicted in FIG. 4. The electrode assembly 4 comprises a positive electrode plate 5, a negative electrode plate 6, and a separator 7, wherein the positive electrode plate 5 and the negative electrode plate 6 are laid upon another with the separator 7 inserted therebetween and wound.

Insulating rings 8 are disposed above and below the electrode assembly 4 to prevent short-circuiting. A positive electrode lead 5a connected to the positive electrode plate 5 is extended through the upper insulating ring 8 and is electrically connected to a sealing plate 2 serving as a positive terminal. On the other hand, a negative electrode lead 6a connected to the negative electrode 6 is extended through the lower insulating ring and is electrically connected to the battery case 1 serving as a negative terminal. The clearance between the opening portion of the battery case 1 and the sealing plate 2 is sealed with an insulating packing 3.

Hereinafter, the present invention will be concretely described by way of examples.

EXAMPLE 1

A metal jacket was formed using a magnesium-based ternary alloy containing lithium, and a cylindrical lithium secondary battery A was manufactured using the metal jacket.

In the formation of the metal jacket, a ternary alloy comprising 84.8% by weight of Mg, 14% by weight of Li, and 1.2% by weight of Al was used. This alloy was subjected to thixomolding to give a thin sheet having a thickness of 0.5 mm. Next, a 20 $\mu$m-thick nickel foil was superposed on one face of the thin sheet, followed by rolling to provide a clad plate. This clad plate was punched into a disk, and the resultant disk was subjected to a combined drawing and ironing process to give a cylindrical metal jacket in a shape of a bottomed can with an open top having an outer diameter of 13.8 mm and a height of 54.0 mm. This process was performed so that the nickel foil side should form the inner surface of the resultant metal jacket. The open end portion of the metal jacket was cut off.

As a result, there was obtained a cylindrical metal jacket having an outer diameter of 13.8 mm, a height of 49.0 mm, a bottom wall thickness of 0.5 mm, a side wall thickness of 0.4 mm, and a bottom/side wall thickness ratio of 1.25. The side wall thickness was measured at a midpoint in the vertical height and was considered to be an average thickness of the side wall. The metal jacket thus obtained had a remarkably reduced weight as small as about ½ of that of a conventional metal jacket made of an aluminum-based alloy.

Next, positive and negative electrodes and a separator as power generating elements were prepared as following.

The positive electrode used was obtained by applying a paste comprising $LiCoO_2$, Acetylene black and a fluorocarbon polymer onto an aluminum foil, drying, rolling and cutting to a predetermined size.

The negative electrode used was obtained by applying a paste comprising spherical graphite, styrene-butadiene rubber, carboxymethylcellulose and water onto a copper foil, drying, rolling and cutting to a predetermined size.

The separator used was a microporous polyethylene film having a thickness of 0.027 mm.

The electrolyte used was prepared by mixing ethylene carbonate and diethyl carbonate in a molar ratio of 1:3 and dissolving lithium hexafluorophosphate ($LiPF_6$) into the mixture to a concentration of 1 mol/liter.

The cylindrical lithium secondary battery was assembled with use of the metal jacket as follows.

First, a stack of the positive electrode and the negative electrode with the separator intervening between the two was wound to give an electrode assembly so that the negative electrode form the outermost layer of the assembly. The electrode assembly thus formed was placed into the aforementioned metal jacket. This resulted in direct electrical connection made between the metal jacket and the negative electrode. Subsequently, the electrolyte was injected into the metal jacket. The positive electrode, on the other hand, was connected to a positive electrode lead of aluminum, which was connected to a sealing plate serving as a positive terminal. The open top of the metal jacket was then sealed with the sealing plate. At this time, an insulating packing was placed between the sealing plate and the peripheral portion of the metal jacket.

The battery A thus obtained was an AA-size cylindrical battery having a diameter of 14 mm, a height of 50 mm, and a battery capacity of 600 mAh.

COMPARATIVE EXAMPLE 1

A conventional aluminum-based alloy was used to form a metal jacket having the same shape as and equal bottom wall thickness and side wall thickness to the battery A. With use of this metal jacket, a lithium secondary battery B was assembled in the same manner as in Example 1. The aluminum-based alloy used in the battery B was an Al 3003 alloy containing manganese.

Since the aluminum-based alloy was used for the metal jacket in the battery B, the relation between the positive electrode and the negative electrode in the battery B was reverse to that in the battery A. Accordingly, the metal jacket was electrically connected directly to the positive electrode plate. The capacity of this battery B was 600 mAh.

The batteries A and B are different from each other in the raw material of metal jacket. The metal jacket of the battery A is lighter than that of the battery B and hence has an advantage in terms of weight energy density of the battery.

Further, the battery A is superior to the battery B in mechanical strength. It is, therefore, possible to further make the metal jacket of the battery A thinner, though the metal jackets of example 1 and comparative example 1 were both equally made to have a side wall thickness of 0.4 mm and a capacity of 600 mAh.

Because of the difference in the raw material of the metal jacket, the battery A was lighter by about 0.5 g than the battery B despite the fact that the capacity of the battery A was equal to that of the battery B.

Next, the charge/discharge cycle life of each battery was evaluated.

Specifically, the batteries A and B were respectively subjected to a constant-voltage and constant-current charging at an electric current of 0.6 A or less at 20° C. up to a voltage of 4.2 V and then subjected to a constant-current discharging at a current of 120 mA at 20° C. down to a final voltage of 3 V. This charge/discharge cycle was repeated 500 times. This cycle life test proved that both of the batteries A and B exhibited very stable performance up to the 500th cycle. Thus, the batteries A and B were found to have substantially equal charge/discharge cycle life. In the evaluation of other battery properties, there was not observed any significant difference between the two batteries.

Thus, it was proved that the use of the metal jacket made of a magnesium-based alloy containing lithium, which had conventionally been considered to have a poor corrosion resistance, made it possible to provide a battery having both higher energy density and higher reliability.

EXAMPLES 2–29

COMPARATIVE EXAMPLES 2–7

The composition of the alloy to be used for the metal jacket of a cylindrical lithium secondary battery was studied.

In this study were used Mg—Li (x) binary alloys shown in Table 1, Mg—Li(x)-$X^1$(y) ternary alloys shown in Table 2, and Mg—Li(x)-$X^1$(y)-$X^2$(z) quaternary alloy shown in Table 3. In these tables, $X^1$ and $X^2$ represent Al, Zn, Mn, Zr, Mm or Y, independently, and x, y and z represent the content in wt. % of Li, $X^1$ and $X^2$ in the alloy, respectively, the balance of the alloy being Mg. It should be noted that this study employed the same conditions as in example 1 except the composition of the alloy used.

First, metal jackets were formed using the alloys of the respective compositions shown in Tables 1 to 3 in the same manner as in example 1. Among them, metal jackets that could be formed without any problem were used to manufacture a battery in the same manner as in example 1. Batteries thus obtained were evaluated as in example 1.

TABLE 1

| Batteries | Composition of alloy used for metal jacket (x in parentheses represents the content of Li in wt % and the balance is Mg) | |
|---|---|---|
| Comparative Example 2 | C1 | Mg—Li(x)  x = 5 |
| Example 2 | C2 | x = 10 |
| Example 3 | C3 | x = 15 |
| Example 4 | C4 | x = 20 |
| Comparative Example 3 | C5 | x = 25 |
| Comparative Example 4 | C6 | x = 30 |

TABLE 2

| Batterie | Composition of alloy used for metal jacket (x and y in parentheses represents the content of Li, and Al, Zn, Mn, Zr, Mm or Y, respectively, in wt % and the balance is Mg) | | |
|---|---|---|---|
| Comparative Example 5 | D1 | Mg—Li(x)—Al(y) | x = 5 | y = 1 |
| Example 5 | D2 | | x = 10 | y = 1 |
| Example 6 | D3 | | x = 15 | y = 1 |
| Example 7 | D4 | | x = 20 | y = 1 |
| Comparative Example 6 | D5 | | x = 25 | y = 1 |
| Comparative Example 7 | D6 | | x = 30 | y = 1 |
| Example 8 | D7 | | x = 10 | y = 0.1 |
| Example 9 | D8 | | x = 10 | y = 0.3 |
| Example 10 | D9 | | x = 10 | y = 2 |
| Example 11 | D10 | | x = 10 | y = 4 |
| Example 12 | D11 | | x = 10 | y = 6 |
| Example 13 | D12 | Mg—Li(x)—Zn(y) | x = 10 | y = 0.1 |
| Example 14 | D13 | | x = 10 | y = 0.3 |
| Example 15 | D14 | | x = 10 | y = 1 |
| Example 16 | D15 | | x = 10 | y = 2 |
| Example 17 | D16 | | x = 10 | y = 4 |
| Example 18 | D17 | | x = 10 | y = 6 |
| Example 19 | D18 | Mg—Li(x)—Mn(y) | x = 10 | y = 1 |
| Example 20 | D19 | Mg—Li(x)—Zr(y) | x = 10 | y = 1 |
| Example 21 | D20 | Mg—Li(x)—Mm(y) | x = 10 | y = 1 |
| Example 22 | D21 | Mg—Li(x)—Y(y) | x = 10 | y = 1 |

TABLE 3

| Batteries | Composition of alloy used for metal jacket (x, y and z in parentheses represents the content of Li, and Al or Zn, and Zn, Mn or Mm, respectively, in wt % and the balance is Mg) | | | |
|---|---|---|---|---|
| Example 23 | E1 | Mg—Li(x)—Al(y)—Zn(z) | x = 10 | y = 0.02 | z = 0.01 |
| Example 24 | E2 | | x = 10 | y = 2 | z = 1 |
| Example 25 | E3 | | x = 10 | y = 2 | z = 2 |
| Example 26 | E4 | | x = 10 | y = 4 | z = 1 |
| Example 27 | E5 | | x = 10 | y = 4 | z = 3 |
| Example 28 | E6 | Mg—Li(x)—Al(y)—Mn(z) | x = 10 | y = 2 | z = 1 |
| Example 29 | E7 | Mg—Li(x)—Zn(y)—Mm(z) | x = 10 | y = 2 | z = 1 |

In the manufacture of metal jackets, the Mg—Li (x=5) alloy (corresponding to battery C1) had a drawback in mechanical processing. The Mg—Li (x=10) alloy (corresponding to battery C2) exhibited somewhat improved workability as compared with the Mg—Li (x=5) alloy, which, however, was still insufficient. Any one of the Mg—Li (x=15 or more) alloys (corresponding to batteries C3 to C6) exhibited good workability.

Among all the ternary and quaternary alloys, only the Mg—Li(x=5)-Al(y=1) ternary alloy (corresponding to battery D1) had a drawback in workability.

All the batteries shown in tables 1 to 3 except batteries C1, C2 and D1 were assembled and then evaluated in the same manner as in example 1.

As a result, any one of the batteries except batteries C5, C6, D5, D6, D7, D11, D12, D17 and E5 was found to realize charge/discharge cycles without any problem and hence to exhibit a long charge/discharge cycle life.

On the other hand, any one of the batteries C5, C6, D5, D6, D7, D11, D12, D17 and E5 exhibited a somewhat decreased electric capacity by the 500th cycle. When each of these batteries was disassembled, the metal jacket was found to have corroded.

In view of the results thus obtained, the composition of each alloy was studied in more detail. As a result, the following considerations can be given.

When roughly sorted, there are two major factors determining a composition of the alloy to be used for a metal jacket. One is the mechanical workability, and the other is the corrosion resistance. Optimal compositions satisfying these two requirements are those containing magnesium as a major component, and lithium in an amount of 7 to 20% by weight. Among them, the magnesium-based binary alloy preferably contains lithium in an amount of 12 to 16% by weight. The magnesium-based multi-element alloy comprising three or more elements preferably contains lithium in an amount of 7 to 15% by weight, and the element X in an amount of 0.3 to 5% by weight, wherein the element X is at least one element selected from the group consisting of Al, Zn, Mn, Zr, Ca, Si, and rare earth metallic elements. It should be noted that though only the results of the binary to quaternary alloys are shown in the foregoing tables, a battery E8 using a Mg—Li(x)-Al(y)-Zn(z)-Mn(v) quinary alloy wherein x=10, y=2, z=0.5, and v=0.5, for example, was confirmed to exhibit performance equivalent to that of the battery E6 or E7.

The following knowledge was obtained from the study.

The addition of Li to Mg can decrease the density of the resulting alloy. The addition of Li is known to cause the crystal structure to change from α-phase of hexagonal close-packed structure to β-phase of body-centered cubic structure with increasing amount of Li added. This β-phase provides a great leap in improving the workability of the alloy in cold work. A practically optimal amount of Li to be added is about 10 to 15% by weight in the resulting alloy.

The effect of the addition of the third component X added to magnesium-based alloy containing lithium is briefly described below.

Al, for example, has effects of improving the strength and corrosion resistance but decreasing the ductility, malleability and impact resistance of the alloy. Zn improves the mechanical properties, and Mn improves the corrosion resistance of the alloy. Si forms an intermetallic compound ($Mg_2Si$) thereby improving the creep properties of the alloy. A rare earth metallic element contributes to an improvement in strength as well as corrosion resistance of the alloy.

Next, with respect to magnesium-based alloy containing lithium, a typical casting process and thixomolding process were studied by comparison with each other.

A ternary alloy containing 84.8% by weight of Mg, 14% by weight of Li, and 1.2% by weight of Al was obtained by the typical casting process using a high frequency induction furnace, and the alloy thus obtained was mechanically rolled to give a sheet having a thickness of 0.5 mm. On the other hand, the thixomolding process was used to give an alloy sheet of the same composition having a thickness of 0.5 mm.

For determining the limit of the thickness of the metal jacket, these sheets were subjected to combined drawing and ironing process as in example 1 to form respective metal jackets. In this case, the limit of the ratio of bottom wall thickness (TA)/side wall thickness (TB) was determined. As a result, the limit of the ratio of TA/TB was substantially 1.5 for the sheet obtained by the casting process. The sheet obtained by the thixomolding process, on the other hand, could attain a TA/TB ratio of about 2.5 to 3.0 without any problem and hence exhibited higher workability. The limit was judged by the occurrence of a fracture, crack or the like. It was proved from the foregoing that an alloy prepared by thixomolding process was capable of providing a metal jacket having a thinner wall than an alloy having the same composition but prepared by the typical casting process. The metal jacket having a TA/TB ratio of about 1.1 to 2.0 can enjoy a sufficient weight-reduction effect.

EXAMPLES 30–32

Sorts of metal layers to be applied on the inner wall of the metal jacket for preventing corrosion of the metal jacket and the optimal thickness of the metal layer were studied using cylindrical lithium secondary batteries.

The alloy used for the metal jacket was the same alloy as used in example 1. Three sorts of metals, i.e., Ni, Cu and Al, were selected as the metal to be applied onto the inner wall of the metal jacket. In integrating the metal layer with the the metal jacket by cladding, the thickness of the resulting metal layer after the manufacture of the metal jacket was adjusted to about 10 μm.

First, suitableness of each metal was examined.

As a result, batteries F1 (corresponding to example 30) and F2 (corresponding to example 31) having a Ni layer and a Cu layer, respectively, were found to exhibit satisfactory properties including stabilized charge/discharge cycle property. By contrast, a battery F3 (corresponding to example 32) having an Al layer on the inner wall thereof was found to have unsatisfactory charge/discharge cycle property. The battery F3 did not exhibit satisfactory performance because, presumably, aluminum formed a compound with lithium and became brittle, and lithium reacted with aluminum became stabilized and hence inactive for the discharge reaction of the battery.

It is, however, known that the case where Al is used for the metal layer can provides a battery exhibiting satisfactory cycle life if the metal jacket is connected to the positive electrode (namely the metal jacket is used as the positive terminal), in lieu of the connection to the negative electrode as in the foregoing cases.

EXAMPLES 33–42

Selecting Ni layer as the metal layer based on the results obtained above, research was conducted to optimize the thickness of the metal layer.

Metal jackets were formed so that the Ni layers on the inner walls thereof should have average thicknesses of 0.5, 1, 2, 5, 10, 15, 20, 25, 30 and 50 μm, respectively. In the same manner as in example 1, batteries were assembled and then subjected to the charge/discharge cycle life test. The batteries having the Ni layers of 0.5, 1, 2, 5, 10, 15, 20, 25, 30 and 50 μm thicknesses are herein termed batteries G1, G2, G3, G4, G5, G6, G7, G8, G9 and G10, respectively, which correspond to examples 33, 34, 35, 36, 37, 38, 39, 40, 41 and 42, respectively.

As a result, the batteries having the 0.5 μm-thick Ni layer and the 1 μm-thick Ni layer, respectively, exhibited relatively low cycle life property, where the thinner the thickness, the lower the cycle life property. On the other hand, the batteries with their Ni layer having thickness of 2 μm or more were stable in terms of the cycle life and free from any problem. Accordingly, the lower limit of the Ni layer thickness is probably 2 μm. For reliably preventing the occurrence of a pinhole or the like, the Ni layer thickness is preferably 5 μm or more. Though the possibility of corrosion decreases as the thickness increases, the upper limit of the Ni layer thickness is preferably about 20 $\mu$m since too thick Ni layer will increase the weight of the whole metal jacket significantly.

Although Ni layer was selected as the metal layer and integrated with the metal jacket by cladding in the above test, Cu layer is also excellent as the metal layer, and the metal layer can effectively formed by plating, vapor-deposition or the like instead of cladding.

EXAMPLE 43

Sorts of insulating layers to be applied on the inner wall of a metal jacket and the optimal thickness of the layer were studied using cylindrical lithium secondary batteries.

A resin was selected as the insulating material. In this case, a metal jacket was formed previously in the same manner as in example 1.

Fine powder of polyethylene was mixed with an aqueous solution of carboxymethylcellulose to prepare a viscous slurry, which in turn was applied onto the inner wall of the metal jacket. The slurry thus applied was dried by heating at about 130° C., with the result that the inner wall of the metal jacket was covered with an insulating layer comprising polyethylene having a thickness of about 10 $\mu$m.

This insulating layer was uniform, had a sufficient mechanical strength, and was firmly integrated with the metal jacket.

In the same manner as in example 1, a lithium secondary battery H was assembled using the metal jacket thus formed. In this case, since the inner wall of the metal jacket was electrically insulated from the negative electrode by the insulating layer formed thereon, a lead was used to electrically connect the negative electrode and the metal jacket.

In the same manner as in example 1, the performance of the battery H was evaluated by testing the charge/discharge cycle life thereof. As a result, there was not observed any problem up to the 500th cycle, and, hence the battery H was confirmed to have a long cycle life.

Study of other resins revealed that polypropylene exhibited an effect as excellent as polyethylene. The thickness of the insulating layer is preferably 5 $\mu$m or more from the viewpoint of the cycle life property. Though the energy density of the battery lowers to some extent with increasing thickness of the insulating layer, such an insulating layer provides, by virtue of its flexibility, an additional effect of advantageously relieving strain from the swelling of the electrode-active material which occurs as the charge/discharge cycle proceeds. Thus, even a considerably thick insulating resin layer provides advantages in terms of cycle life.

Like the foregoing resins, metal oxides are also effective as the material of the insulating layer. A preferred process for forming a metal oxide layer comprises directly oxidizing a surface of the magnesium-based alloy sheet. Further, a combination of a metal oxide and a resin to form the insulating layer is effective for improving the adherence of the insulating layer to the metal jacket.

While examples of the present invention have been described by way of the cylindrical lithium secondary batteries, the present invention is also effectively applicable to rectangular lithium secondary batteries. In the manufacture of a rectangular battery, a sheet of an alloy to be formed into a metal jacket is desirably punched ovally.

INDUSTRIAL APPLICABILITY

As has been described, the present invention makes it possible to provide a highly reliable and safe lithium secondary battery which allows a reduction in weight and an increase in energy density by achieving improvements in the mechanical workability of the alloy to be formed into a metal jacket and the corrosion resistance of the metal jacket at one time, which have conventionally been left unachieved, by use of a magnesium-based alloy which is capable of making the metal jacket lighter and thinner. Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A lithium secondary battery comprising an electrode assembly and a non-aqueous electrolyte, both accommodated in a metal jacket,
   wherein said metal jacket is made of a magnesium-based alloy containing lithium in an amount of 7 to 20% by weight; and a metal layer for preventing corrosion of said metal jacket is formed integrally with said metal jacket on an inner wall thereof.

2. The lithium secondary battery in accordance with claim 1, wherein said magnesium-based alloy contains lithium in an amount of 7 to 15% by weight, and at least one element selected from the group consisting of Al, Zn, Mn, Zr, Ca, Si, and rare earth elements in a total amount of 0.3 to 5% by weight.

3. The lithium secondary battery in accordance with claim 1, wherein said magnesium-based alloy is a binary alloy containing lithium in an amount of 12 to 16% by weight.

4. The lithium secondary battery in accordance with claim 1, wherein said metal layer comprises Ni or Cu.

5. The lithium secondary battery in accordance with claim 1, wherein said metal layer is formed by cladding, plating or vapor-deposition.

6. A lithium secondary battery comprising an electrode assembly and a non-aqueous electrolyte, both accommodated in a metal jacket,
   wherein said metal jacket is made of a magnesium-based alloy containing lithium in an amount of 7 to 15% by weight, and at least one element selected from the group consisting of Al, Zn, and Mn in a total amount of 0.3 to 5% by weight;
   a Ni layer having a thickness of 2 to 20 $\mu$m is formed integrally with said metal jacket on an inner wall thereof by cladding; and
   said metal jacket is electrically connected to a negative electrode in said electrode assembly.

7. The lithium secondary battery in accordance with claim 6, wherein said magnesium-based alloy is produced by thixomolding.

8. The lithium secondary battery in accordance with claim 6, wherein said metal jacket is in a shape of a bottomed can with an open top, having a bottom/side wall thickness ratio of 1.1 to 2.0; and said magnesium-based alloy is produced by thixomolding.

9. A method of manufacturing a lithium secondary battery, comprising the steps of:
   (1) preparing a sheet of a magnesium-based alloy containing lithium in an amount of 7 to 15% by weight, and at least one element selected from the group consisting of Al, Zn, and Mn in a total amount of 0.3 to 5% by weight by thixomolding;

(2) forming a Ni layer integrally with said sheet on at least one face thereof by cladding;

(3) forming a metal jacket in a shape of a bottomed can with an open top with said Ni layer formed on an inner wall thereof from said sheet by a mechanical processing selected from drawing, combined drawing and ironing, and impact; and (4) placing an electrode assembly and a non-aqueous electrolyte into said metal jacket.

10. A lithium secondary battery comprising an electrode assembly and a non-aqueous electrolyte, both accommodated in a metal jacket, wherein said metal jacket is made of a magnesium-based alloy containing lithium in an amount of 7 to 20% by weight; and an insulating layer is formed integrally with said metal jacket on an inner wall thereof.

11. The lithium secondary battery in accordance with claim 10, wherein said magnesium-based alloy contains lithium in an amount of 7 to 15% by weight, and at least one element selected from the group consisting of Al, Zn, Mn, Zr, Ca, Si, and rare earth elements in a total amount of 0.3 to 5% by weight.

12. The lithium secondary battery in accordance with claim 10, wherein said magnesium-based alloy is a binary alloy containing lithium in an amount of 12 to 16% by weight.

13. The lithium secondary battery in accordance with claim 10, wherein said insulating layer comprises a metal oxide or a resin.

14. A lithium secondary battery comprising an electrode assembly and a non-aqueous electrolyte, both accommodated in a metal jacket, wherein said metal jacket is made of a magnesium-based alloy containing lithium in an amount of 7 to 15% by weight, and at least one element selected from the group consisting of Al, Zn, and Mn in a total amount of 0.3 to 5% by weight; and a resin layer having a thickness of 5 $\mu$m or more is formed integrally with said metal jacket on an inner wall thereof.

15. The lithium secondary battery in accordance with claim 14, wherein said magnesium-based alloy is produced by thixomolding.

16. The lithium secondary battery in accordance with claim 14, wherein said metal jacket is in a shape of a bottomed can with an open top, having a bottom/side wall thickness ratio of 1.1 to 2.0; and said magnesium-based alloy is produced by thixomolding.

17. A method of manufacturing a lithium secondary battery, comprising the steps of:

(1) preparing a sheet of a magnesium-based alloy containing lithium in an amount of 7 to 15% by weight, and at least one element selected from the group consisting of Al, Zn, and Mn in a total amount of 0.3 to 5% by weight by thixomolding;

(2) forming a resin layer integrally with said sheet on at least one face thereof;

(3) forming a metal jacket in a shape of a bottomed can with an open top with said resin layer formed on an inner wall thereof from said sheet by a mechanical processing selected from drawing, combined drawing and ironing, and impact; and (4) placing an electrode assembly and a non-aqueous electrolyte into said metal jacket.

18. A method of manufacturing a lithium secondary battery, comprising the steps of:

(1) preparing a sheet of a magnesium-based alloy containing lithium in an amount of 7 to 15% by weight, and at least one element selected from the group consisting of Al, Zn, and Mn in a total amount of 0.3 to 5% by weight by thixomolding;

(2) forming a metal jacket in a shape of a bottomed can with an open top from said sheet by a mechanical processing selected from drawing, combined drawing and ironing, and impact;

(3) forming a resin layer integrally with said metal jacket on an inner wall thereof; and (4) placing an electrode assembly and a non-aqueous electrolyte into said metal jacket.

* * * * *